US010908427B2

(12) United States Patent
Mainguet

(10) Patent No.: US 10,908,427 B2
(45) Date of Patent: Feb. 2, 2021

(54) SYSTEM FOR VIRTUAL REALITY OR AUGMENTED REALITY HAVING AN EYE SENSOR AND METHOD THEREOF

(71) Applicant: COMMISSARIAT A L'ENERGIE ATOMIQUE ET AUX ENERGIES ALTERNATIVES, Paris (FR)

(72) Inventor: Jean-Francois Mainguet, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/579,327

(22) Filed: Sep. 23, 2019

(65) Prior Publication Data
US 2020/0103655 A1 Apr. 2, 2020

(30) Foreign Application Priority Data
Sep. 24, 2018 (FR) .................................... 18 58660

(51) Int. Cl.
G02B 27/01 (2006.01)
G02B 27/00 (2006.01)
(Continued)

(52) U.S. Cl.
CPC ..... G02B 27/0172 (2013.01); G02B 27/0093 (2013.01); G06F 3/013 (2013.01);
(Continued)

(58) Field of Classification Search
CPC ........ G02B 2027/0178; G02B 27/0172; G02B 2027/0138; G02B 2027/014;
(Continued)

(56) References Cited

U.S. PATENT DOCUMENTS 8,184,867 B2 * 5/2012 Otto ................... G06K 9/00617
382/117
2014/0145939 A1 5/2014 Herold et al.
(Continued)

OTHER PUBLICATIONS

French Preliminary Search Report dated Jun. 28, 2019 in French Application 18 58660 filed on Sep. 24, 2018 (with English Translation of Categories of Cited Documents).
(Continued)

Primary Examiner — Laurence J Lee
(74) Attorney, Agent, or Firm — Oblon, McClelland, Maier & Neustadt, L.L.P.

(57) ABSTRACT

A system for vision in virtual reality or augmented reality is provided, in a support to be mounted on a head of a user, the system including a matrix of light-emission elements extending according to a display surface for display of images configured to be seen by the user; an optical projection system to form an image of the elements on a focusing surface at a distance from an eye of the user; a matrix of photo-detectors to acquire an image of a region of the eye extending according to a capture surface and arranged coplanar with the elements and at least partially overlapping with the capture surface and the display surface; and a computer to receive as an input the image acquired, and to process the same to deduce a parameter relative to the user, the optical projection system being a variable-focal-length optical system.

14 Claims, 6 Drawing Sheets

(51) Int. Cl.
*G06F 3/01* (2006.01)
*G06T 19/00* (2011.01)

(52) U.S. Cl.
CPC ............ *G06F 3/017* (2013.01); *G06T 19/006* (2013.01); *G02B 2027/014* (2013.01); *G02B 2027/0138* (2013.01); *G02B 2027/0178* (2013.01)

(58) Field of Classification Search
CPC .......... G02B 27/017; G02B 2027/0187; G02B 27/0093; G06F 3/013; H06T 19/006
See application file for complete search history.

(56) References Cited

U.S. PATENT DOCUMENTS

| | | | |
|---|---|---|---|
| 2014/0351896 | A1 | 11/2014 | Koo |
| 2017/0177075 | A1* | 6/2017 | Zhang ................... G06T 7/20 |
| 2018/0196512 | A1* | 7/2018 | Kim ..................... G06T 19/006 |
| 2018/0239145 | A1 | 8/2018 | Lanman et al. |
| 2019/0297280 | A1* | 9/2019 | Bishop .................. H04N 5/355 |
| 2019/0304192 | A1* | 10/2019 | Waye ................... G06F 16/4387 |

OTHER PUBLICATIONS

Damien Constantine Rompapas, et al., "EyeAR: Refocusable Augmented Reality Content through Eye Measurements", Multimodal Technologies and Interaction, vol. 1, No. 4, Sep. 26, 2017, 18 pages.

* cited by examiner

SYSTEM FOR VIRTUAL REALITY OR AUGMENTED REALITY HAVING AN EYE SENSOR AND METHOD THEREOF

TECHNICAL FIELD

Virtual reality designates a technology that places a user in an environment that is artificially generated and in which the user can interact using software.

Augmented reality designates a technology that superimposes reality and display elements generated by software.

The invention relates to the field of systems for vision in virtual reality or in augmented reality, comprising a support of the scope, mask or helmet type intended to be mounted on the head of a user.

PRIOR ART

In the prior art systems are known for vision in virtual reality comprising a mask provided with two display screens each located facing an eye, during use. Each screen is placed in the focal plane of a respective optical projection system, in such a way as to project an image to infinity which can be seen by the user without effort of accommodation.

A system for vision in virtual reality is generally provided with sensors, for detecting the movements and/or the orientation of the head, which allows to adapt the image seen by the user in real time in order to produce the illusion of an immersion in the artificially generated environment.

The system for vision in virtual reality can take on board a processor that locally executes virtual-reality applications and manages the video display on the two display screens. Alternatively, the system for vision in virtual reality is connected to an outside processor, by a wired or wireless link.

For example the system for vision in virtual reality Oculus Rift is known, which is in the form of a mask rigidly connected to a strap. The mask is intended to be applied in front of the eyes, while blocking the outside light. It receives not two individual screens, but a single flat screen which during use covers both eyes and displays two juxtaposed individual images. Two lenses are configured to each project one of these individual images.

Systems for vision in augmented reality of the "head-up display" type, or smart glasses, are also known. In such a system, the display screens are moved out of the field of vision of the user. Optical systems based on beam splitters allow to project images into the field of vision of the user, while letting the outside light pass through. It is thus possible to provide the user with visual information that is superimposed on the vision of their real environment.

One goal of the present invention is to improve the existing systems for vision in virtual reality or in augmented reality, which comprise a support intended to be mounted on the head of a user.

DESCRIPTION OF THE INVENTION

This goal is reached with a system for vision in virtual reality or in augmented reality comprising, in a support intended to be mounted on the head of a user:
- at least one matrix of light-emission elements which extends according to a display surface dedicated to the display of images intended to be seen by the user; and
- at least one optical projection system, capable of forming an image of the matrix of light-emission elements on a focusing surface at a distance from an eye of the user.

The vision system further comprises:
- at least one matrix of photo-detectors, adapted for acquiring at least one image of a region of the eye which extends according to a capture surface and which is arranged substantially coplanar with the matrix of light-emission elements, with an at least partial overlap between the capture surface and the display surface; and
- a computer, configured to receive as an input the at least one image acquired by the matrix of photo-detectors, and to implement a processing of said at least one image in such a way as to deduce therefrom one or more parameters relative to the user, in particular relative to the eye of the user.

According to the invention, the optical projection system is a variable-focal-length optical system, connected to a control device for the control of its focal length.

The substantially coplanar arrangement of the matrix of photo-detectors and of the matrix of light-emission elements corresponds to a distance between the latter two, along an axis orthogonal to the plane of the matrix of photo-detectors, less than or equal to three times a pixel spacing of the matrix of photo-detectors. Even more preferably, this distance is less than or equal to the pixel spacing of the matrix of photo-detectors.

Advantageously, the at least partial overlap translates into an arrangement of the matrix of photo-detectors and of the matrix of light-emission elements interlocking with each other over at least a portion of their respective surfaces. In particular, photo-detectors of the matrix of photo-detectors are interposed between light-emission elements of the matrix of light-emission elements, or vice versa. In yet other words, the two matrices are intertangled with each other, or interleaved together, over at least a portion of their respective surfaces. They can in particular be each defined by lines and columns that criss-cross with the lines and the columns of the other matrix.

The matrix of photo-detectors allows to acquire an image of a region located inside the eye, this image then being used in the computer to deduce therefrom a parameter relative to the user. This parameter can comprise:
- a position of the eye of the user, namely an angular position, obtained namely using an at least partial image of their retina;
- a movement of the eye of the user, namely an angular movement, obtained namely using a series of at least partial images of their retina;
- an identifier of the user, determined on the basis of an element characteristic of an image of their eye, more particularly an at least partial image of their retina or of their iris;
- an indicator of sharpness of an at least partial image of their retina, a function namely of defects of an optical system formed by the eye; etc.

Advantageously, the parameter relative to the user is transmitted to a device for display selection controlling a video display by the matrix of light-emission elements.

Since the matrix of photo-detectors is arranged substantially coplanar with the matrix of light-emission elements, the system according to the invention allows to acquire an image of the eye while providing good compactness.

Moreover, in a system for vision in virtual reality or in augmented reality, the matrix of light-emission elements is imaged, during use, on the retina of the eye. In other words, during use, the matrix of light-emission elements and the retina are optically conjugated by an optical system comprising at least the optical projection system and the elements of the eye between the retina and the cornea (plus if necessary vision-correction lenses of the contact lens type). Since the matrix of photo-detectors is arranged substantially coplanar with the matrix of light-emission elements, the same position of the assembly formed by the latter two allows both to acquire an image of the retina of the eye and to project images onto this same retina in order for them to be seen by the user. This particularity has numerous uses, namely:

- the acquisition of at least partial images of the retina during a video display by the matrix of light-emission elements, in order to follow movements of the eye of the user without interrupting the video display and thus allow to adapt the image seen by the user in real time in order to produce the illusion of an immersion in a virtual environment;
- the acquisition of at least partial images of the retina, in order to identify a user by their retina without modification of an adjustment of the optical projection system;
- the acquisition of an at least partial image of the retina, in order to calculate its sharpness and thus verify whether the optical conjugation between the retina, on the one hand, and the assembly formed by the matrix of photo-detectors and the matrix of light-emission elements, on the other hand, is well carried out;
- the acquisition of a series of least partial images of the retina, in order to determine a movement of the eye of the user corresponding to an unlocking key; etc.

The invention also relates to a method for acquiring parameters of the eye, implemented using a system according to the invention, and which comprises the following steps:

- positioning of the support on the head of a user;
- acquisition of at least one image of a region of an eye of the user, using the matrix of photo-detectors; and
- processing of the at least one acquired image, using the computer, in order to deduce therefrom one or more parameters relative to the eye of the user.

The step of acquiring at least one image can comprise the acquisition of an at least partial image of the retina. In particular, the method according to the invention further comprises the following steps:

- acquisition of an at least partial image of the retina, using the matrix of photo-detectors;
- using the computer, calculation of an indicator representative of the sharpness of the acquired image, formulation of the command for adjustment of focal length, and transmission of this command to the control device;
- using the control device, adjustment of the focal length of the optical projection system according to said command for adjustment of focal length;

these steps being implemented one or more times, and until a maximum sharpness of the image of the retina is obtained.

The method according to the invention can be implemented in a system as mentioned above which further comprises at least one illumination device configured to emit an illumination light beam outside of the visible spectrum, and during the acquisition of at least one image, the eye receives the illumination light beam emitted by the illumination device.

BRIEF DESCRIPTION OF THE DRAWINGS

The present invention will be better understood upon reading the description of embodiments given for purely informational purposes and in a manner that is in no way limiting, while referring to the appended drawings in which.

DETAILED DESCRIPTION OF SPECIFIC EMBODIMENTS

Figure 1:
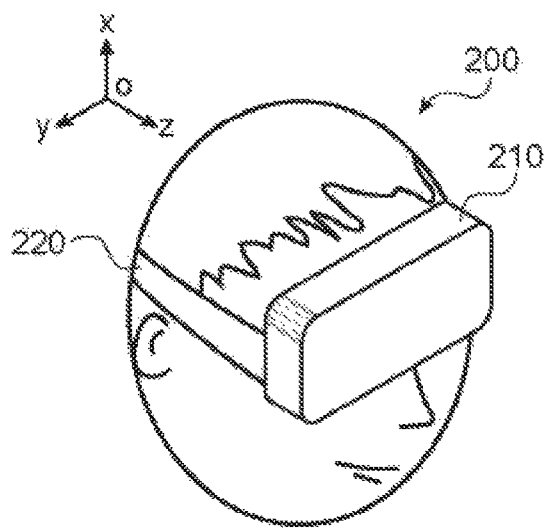
FIG. 1 illustrates schematically and in a perspective view, a first embodiment of a system for vision in virtual reality facilitating the comprehension of the invention, during use.

For more clarity, the axes (Ox), (Oy) and/or (Oz) of an orthonormal reference frame have been shown in the drawings.

FIGS. 1 to 6B relate to vision systems which differ from the vision system according to the invention only in that their optical projection system is not a variable-focal-length optical system, connected to a control device for the control of its focal length. Nevertheless, these drawings allow to facilitate the comprehension of the invention and to illustrate certain aspects of the optical projection system according to the invention.

FIG. 1 illustrates, according to a perspective view, and schematically, a first embodiment of a system for vision in virtual reality 200 facilitating the comprehension of the invention, shown during use mounted on the head of a user. The vision system 200 comprises a support 210 intended to be mounted on the head of a user, here a mask 210. During use, the mask 210 is maintained against the face of the user, while covering their eyes, namely using a strap 220 mounted in a rigidly connected way onto the mask 210 and passing behind the head of the user.

Figure 2:
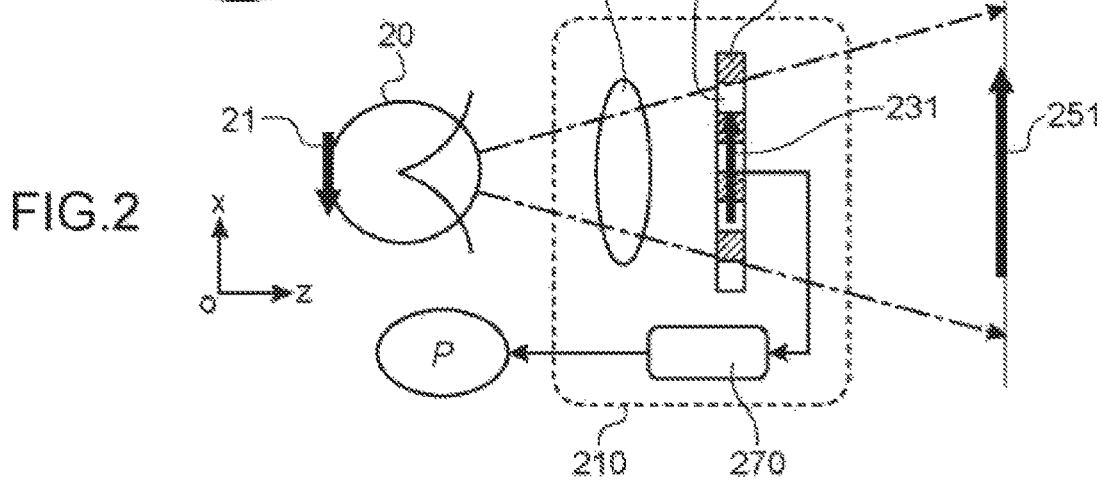
FIG. 2 illustrates schematically and in a cross-sectional view, the vision system of FIG. 1.

FIG. 2 illustrates schematically, and in a cross-sectional view in a plane (xOz), the vision system 200 of FIG. 1.

In order to facilitate the comprehension of the invention, an eye 20 of the user has also been shown, as it is positioned relative to the vision system 200, during use. The eye 20 does not belong to the vision system according to the invention. In order to define the reference frame used, it is defined that when the user looks straight ahead of them, a visual axis of the eye extends parallel to the axis (Oz).

The vision system 200 comprises, on board in the support 210, two assemblies 201 each comprising:
- a matrix of light-emission elements 230;
- an optical projection system 240; and
- a matrix of photo-detectors 260.

Each assembly 201 is associated with one of the two eyes of the user, and extends, during use, opposite this eye, several centimetres from the latter.

The matrix of light-emission elements 230, forms a video display screen for displaying images intended to be seen by the corresponding eye. The light-emission elements are preferably arranged according to lines and columns, and configured to emit in the visible spectrum. The light-emission elements consist of light-emitting diodes, namely light-emitting diodes containing gallium nitride (Gan, InGaN, etc.) or organic light-emitting diodes (OLED or micro-OLED). They preferably comprise diodes of various types, respectively emitting in the red, the blue and the green. Control means, not shown, allow to control the turning on and off of the light-emission elements. The matrix of light-emission elements 230 extends here in a plane parallel to the plane (xOy). In FIG. 2, an arrow 231 represents an image displayed on the matrix of light-emission elements, 230.

The optical projection system 240 consists of one or more lenses which during use extend between the eye 20 and the matrix of light-emission elements 230. The vergence of the optical projection system 240 is approximately 20δ. Preferably, this is not a matrix of microlenses but one or more wide lenses. The optical projection system 240 is configured to project a virtual image of the matrix 230, onto a focusing surface 250 located at a distance from the eye 20.

During use, and when this eye is at rest (does not accommodate), the focusing surface 250 is optically conjugated with a surface passing through the retina of the eye 20, in particular a surface passing through the fovea.

In other words, the eye 20 at rest thus clearly sees the objects located on the focusing surface 250. The optical conjugation between the focusing surface 250 and the surface passing through the retina is carried out by an optical system formed by the elements of the eye between the retina and the cornea, and if necessary a vision-correction lens such as a contact lens. For an emmetropic eye, the focusing surface 250 extends to infinity, and the matrix 230 is located in the image focal plane of the optical projection system 240. In any case the focusing surface 250 extends on the side of the matrix 230 opposite to the optical projection system 240, generally several metres downstream from the latter along the axis (Oz). In FIG. 2, an arrow 251 schematically represents the image projected onto the focusing surface 250 by the optical projection system 240. FIG. 2 also shows an arrow 21 schematically representing the image formed on the retina, conjugate of the image 251 formed on the focusing surface.

The matrix of photo-detectors 260 forms an image sensor substantially coplanar with the matrix of light-emission elements 230, in a plane parallel to the plane (xOy).

The matrix of photo-detectors 260 and the matrix of light-emission elements 230 together form a rigidly connected assembly 202.

The photo-detectors of the matrix 260 extend according to a surface called capture surface. The light-emission elements of the matrix 230 extend according to a surface called display surface. An orthogonal projection of said capture surface in a plane (xOy), is preferably superimposed with a projection in this same plane of said display surface. The superposition can be total or partial. In other words, there is total or partial overlap between the capture surface and the display surface.

The photo-detectors are preferably arranged according to lines and columns. Here, they each consist of a photodiode. Preferably, the photo-detectors of the matrix of photo-detectors all have the same detection characteristics.

During use, a surface passing through the retina is optically conjugated with the focusing surface 250, itself optically conjugated with a surface receiving the matrix of light-emission elements 230. Thus, an image displayed by said matrix 230 is projected onto the retina of the eye. Because of the reversibility of light, the matrix of light-emission elements 230 receives, symmetrically, an image of the retina of the eye. Since the matrix of photo-detectors 260 is arranged substantially coplanar with the matrix 230, it receives, during use, this image of the retina. Thus, an image seen clearly by the user corresponds to a sharp image acquired by the matrix of photo-detectors 260.

By modifying the focal length of the optical projection system 240, other regions of the eye can be imaged for example the iris, using the matrix of photo-detectors 260.

The vision system 200 also comprises a computer, or processor 270. In the embodiment of FIG. 2, the computer 270 is on board on the support 210. Alternatively, this computer 270 can be moved from the support 210 while being connected to the latter by a wired or wireless link. The computer 270 is configured to receive at least one image of the eye acquired by the matrix of photo-detectors 260, and to implement a processing of this image in such a way as to deduce therefrom one or more parameters P relative to the user. Various processing that can be implemented by using this computer 270 is described in detail below.

Figure 3A:
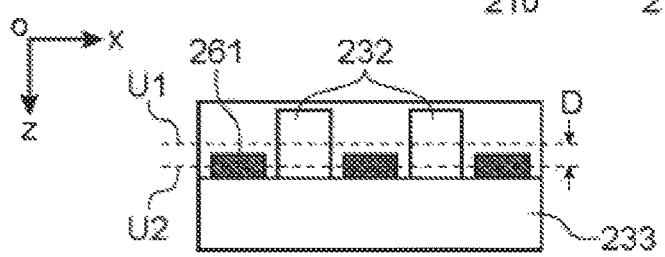
FIGS. 3A to 3C illustrate, in cross-sectional views, various alternatives of an assembly belonging to a system according to the invention, and comprising a matrix of photo-detectors and a matrix of light-emission elements.

FIG. 3A illustrates in a slightly more detailed way than in FIG. 2, in a cross-sectional view in a plane parallel to the plane (xOz), an example of realisation of the assembly comprising the matrix of light-emission elements and the matrix of photo-detectors. In this example of realisation, the matrix of photo-detectors interlocks with the matrix of light-emission elements, with each photo-detector 261 of the matrix of photo-detectors framed between a plurality of light-emission elements 232 of the matrix of light-emission elements.

The light-emission elements 232 extend on a substrate, in particular a semiconductor 233. The photo-detectors 261 also extend on this same substrate 233.

A first median plane U1, parallel to the plane (xOy) of the matrix of photo-detectors 260, and extending at mid-height of the matrix of light-emission elements 230 along the axis (Oz), is defined. Likewise, a second median plane U2, parallel to the plane (xOy) of the matrix of photo-detectors, and extending at mid-height of the matrix of photo-detectors, along the axis (Oz), is defined. According to the invention, a distance D between the planes U1 and U2, along the axis (Oz), is less than or equal to three times a spacing of distribution of the photo-detectors of the matrix of photo-detectors 260. Even more preferably, this distance D is less than or equal to the spacing of distribution of the photo-detectors of the matrix of photo-detectors. In other words, the matrix of photo-detectors is arranged substantially coplanar with the matrix of light-emission elements.

The light-emission element 232 each consist for example of an OLED. They can be arranged together into a matrix of the AMOLED type (Matrix of active of OLED).

Alternatively the light-emission elements 232 each consist for example of a gallium-nitride LED. The gallium-nitride LEDs are preferably made according to a manufacturing method as described in the patent application WO2017/194845. This method comprises the following steps:

transferring, onto a face of integrated control circuits comprising a plurality of metal connection tracks, an active diode stack comprising at least first and second doped semiconductor layers having opposite types of conductivity, in such a way that the second layer of the stack is electrically connected to the metal tracks of the control circuits; and forming, in the active stack, trenches defining a plurality of diodes connected to distinct metal tracks of the control circuits.

During the step of transferring the active diode stack, the positions of the LEDs are not yet defined. There is therefore no strong constraint in terms of precision of alignment. The definition of the LEDs is then carried out by structuration methods providing a precision of alignment clearly greater than that which can be obtained by transfer of one substrate onto another. Such a method allows to create a matrix of gallium-nitride LEDs and a matrix of photo-detectors on the same substrate, with pixels of one of the matrices located between pixels of the other matrix. Via the great precision of alignment of the LEDs on the substrate, very good resolution of the matrix of light-emission elements is preserved. The high resolution of the matrix of light-emission elements can also be combined with a high resolution of the matrix of photo-detectors. The gallium-nitride LEDs also have the advantage of providing a high emission power, which allows to keep a significant portion of the surface of the substrate for the photo-detectors.

Figure 3B:
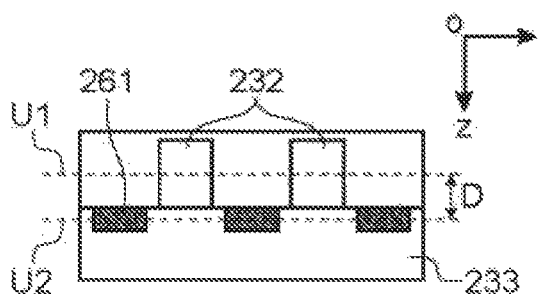

FIG. 3B illustrates an alternative of distribution of the light-emission elements 232 and of the photo-detectors 261. According to this alternative, the light-emission elements 232 are arranged on the semiconductor substrate 233, outside of the latter and in direct physical contact with it. The photo-detectors 261 are arranged inside the substrate 233, touching the upper surface of the latter on the side near the light-emission elements 232.

Figure 3C:
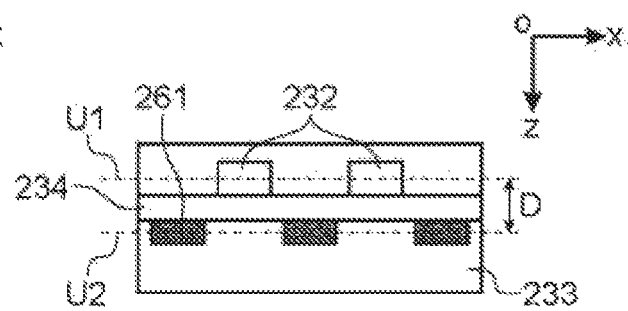

FIG. 3C illustrates another alternative of distribution of the light-emission elements 232 and of the photo-detectors 261. According to this alternative, the light-emission elements 232 are arranged above the semiconductor substrate 233, separated from the latter by a spacer layer 234, while the photo-detectors 261 are arranged in the substrate 233, touching the upper surface of the latter on the side near the light-emission elements 232.

Numerous other alternatives can be implemented without going beyond the context of the invention, for example with transparent light-emission elements, of the OLED type, thus allowing the light-emission elements to extend above the photo-detectors while covering them. According to other alternatives, the two matrices are arranged on distinct substrates disposed near one another.

Figure 4A:
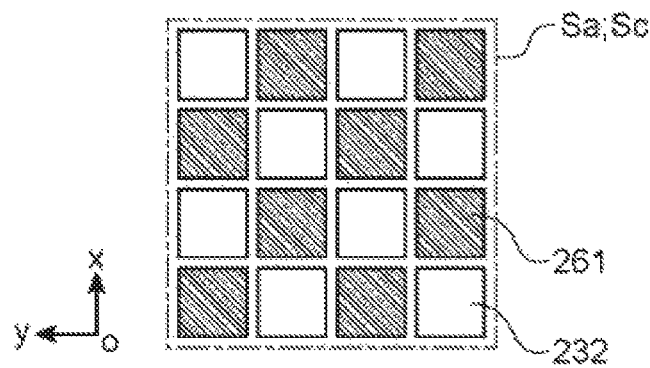
FIGS. 4A to 4C illustrate examples of distribution of the pixels of the matrix of photo-detectors and of the matrix of light-emission elements of a system according to the invention.
Figure 4B:
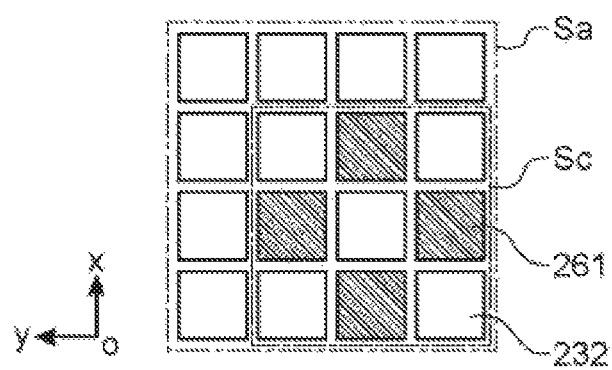
Figure 4C:
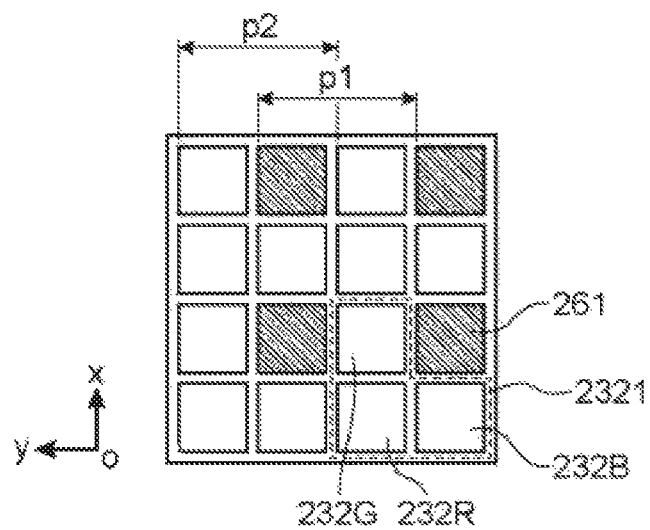

FIGS. 4A to 4C schematically illustrate various examples of distribution of the pixels of the matrix of photo-detectors and of the pixels of the matrix of light-emission elements, in a plane parallel to the plane (Oxy).

In the examples shown, there is no overlap between the light-emission elements 232 and the photo-detectors 261. Photo-detectors 261 of the matrix of photo-detectors are each located between a plurality of light-emission elements 232 of the matrix of light-emission elements.

FIG. 4A illustrates in particular a matrix of photo-detectors 261 which extend according to the capture surface Sc, and a matrix of light-emission elements 232 which extend according to the display surface Sa. Here the surfaces Sc and Sa have the same surface area and there is total overlapping between the latter two. The pixel spacing is identical in the matrix of photo-detectors and in the matrix of light-emission elements. The light-emission elements can be divided into various types of light-emission elements which differ by their emission wavelength.

FIG. 4B illustrates an alternative in which the surface area of the capture surface Sc is less than the surface area of the display surface Sa, and the capture surface Sc is inscribed inside the display surface.

Numerous other alternatives can be implemented without going beyond the context of the invention, for example with the surface area of the capture surface Sc greater than the surface area of the display surface Sa, and/or with an only partial overlap between the latter two, and/or pixel spacings which differ between the two matrices.

FIG. 4C illustrates another example of distribution of the photo-detectors and of the light-emission elements.

Here, the photo-detectors 261 are distributed according to a matrix with a mesh square having a distribution spacing p1.

As for the light-emission elements 232, they are distributed into macro-pixels 2321 each comprising an element for emission in the blue 232B, an element for emission in the red 232R and an element for emission in the green 232G. The macro-pixels are distributed according to a square-mesh matrix having a distribution spacing p2, here with p2=p1. Here, the light-emission elements 232 and the photo-detectors 261 are distributed together according to a square network with an elementary cell which comprises a photo-detector 261, an element for emission in the blue 232B, an element for emission in the red 232R and an element for emission in the green 232G.

The invention is not limited to these examples of distribution of the photo-detectors and of the light-emission elements. In particular, there could be more photo-detectors than light-emission elements, with each light-emission element located between a plurality of photo-detectors of the matrix of photo-detectors. According to other alternatives, there could be a matrix with a non-square mesh, for example hexagonal. According to other alternatives, the matrix of light-emission elements can be of the Bayer filter type or similar.

According to other alternatives, a pixel spacing of the matrix of photo-detectors is greater than or equal to a macro-pixel spacing of the matrix of light-emission elements, with each macro-pixel of the matrix of light-emission elements which comprises light-emission elements of three colours. Indeed, the inventors have demonstrated that the resolution required to obtain a good image of the retina is less than the resolution of certain screens used in systems for vision in virtual reality, these screens corresponding to the matrices of light-emission elements according to the invention. A matrix of light-emission elements according to the invention consists for example of 1280*1024 macro-pixels, or even 2048*2048 macro-pixels. However, an image of the useful surface of the retina, formed by 768*576 pixels, offers a resolution sufficient for the invention (in certain uses described below such as the regulation of the adjustment of the optical projection system, a lesser resolution can suffice). Moreover, the matrix of light-emission elements generally projects an image onto only a portion of the useful surface of the retina, for example approximately a quarter of this useful surface. A good-quality image of this portion of retina can thus be obtained using a matrix of 284*288 light-emission elements, for example. Preferably, a spacing of distribution of the photo-detectors of the matrix of photo-detectors is between one and seven times a spacing of distribution of the pixels or macro-pixels of the matrix of light-emission elements, where each macro-pixel of the matrix of light-emission elements comprises elements for light emission at different wavelengths. There is for example a ratio less than or equal to 3 between these two distribution spacings.

In the drawings, the light-emission elements and the photo-detectors are shown as having the same size. In practice, it is advantageous for the photo-detectors to each have a greater surface area than the light-emission elements, in order to increase their sensitivity. This is namely possible with GaN LEDs which provide a high emission power.

Figure 5:
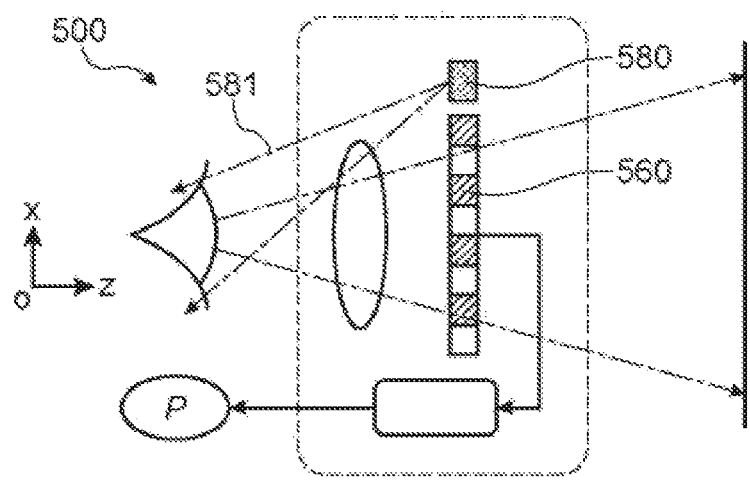
FIG. 5 illustrates schematically and in a cross-sectional view, a second embodiment of a vision system facilitating the comprehension of the invention.

FIG. 5 schematically illustrates, in a cross-sectional view in a plane (xOz), a second embodiment of a vision system 500 facilitating the comprehension of the invention. The vision system 500 only differs from that of FIG. 2 in that it further comprises two illumination devices 580, each associated with an eye of the user.

Each illumination device 580 is capable of emitting towards the corresponding eye, during use, an illumination light beam 581. The illumination light beam 581 has a wavelength spectrum with an emission peak located outside of the visible spectrum, that is to say outside of the spectral band ranging from 380 nm to 750 nm. Preferably, the wavelength spectrum of the light beam 581 extends in the near-infrared or the mid-infrared, at wavelengths between 780 nm and 10 µm. Each illumination device 580 consists for example of an infrared LED, or of an infrared OLED.

The photo-detectors of the matrices of photo-detectors 560 are sensitive to the wavelengths of emission of the illumination devices 580.

Each illumination device 580 allows to illuminate the corresponding eye using a light visible to the associated matrix of photo-detectors 560, and not visible to the eye. In this way, a well-illuminated image of the eye can be obtained, without blinding the user.

Figures 6A, 6B:
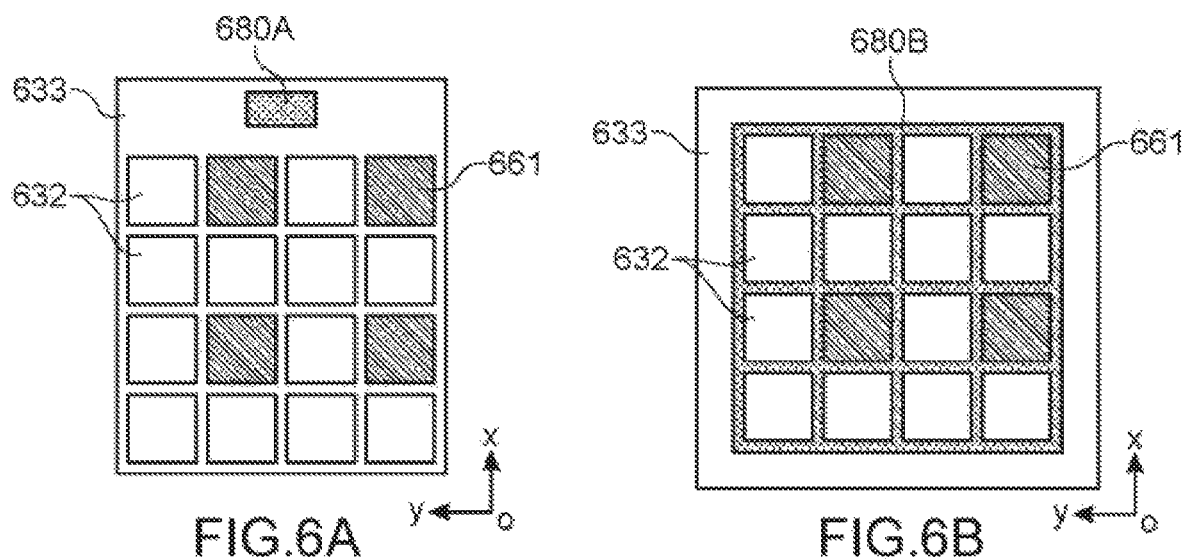
FIGS. 6A and 6B illustrate two alternatives of an assembly comprising the matrix of photo-detectors, the matrix of light-emission elements, and the illumination device of a vision system according to FIG. 5.

FIG. 6A illustrates schematically, and in a cross-sectional view in a plane parallel to the plane (Oxy), an assembly comprising the matrix of photo-detectors, the matrix of light-emission elements, and the illumination device according to the invention.

The photo-detectors 661 and the light-emission elements 632 are distributed as illustrated in FIG. 4C. An illumination device 680A according to the invention is arranged with the latter on the same substrate 633, outside of the matrix of light-emission elements.

According to an advantageous alternative, the illumination device can extend according to an illumination surface arranged substantially coplanar with the matrix of photo-detectors and the matrix of light-emission elements, and with an at least partial overlapping between the illumination surface and the capture surface, respectively the display surface. In the alternative illustrated in FIG. 6B, the illumination device 680B consists of a single OLED which extends according to the entire extension of the matrix of light-emission elements. Preferably, the OLED comprises through-holes at each pixel of the matrix of photo-detectors and/or each light-emission element, in order to let the light though. Alternatively, the OLED can be transparent or partially transparent in the visible and/or to the wavelengths detected by the photo-detectors. According to another alternative, the illumination device consists of a matrix of OLEDs distributed according to the same network as the photo-detectors of the matrix of photo-detectors. Since the OLEDs are all turned on or off at the same time, it is not necessary to provide independent control transistors for each OLED.

According to other alternatives, each illumination device is moved from a substrate receiving the corresponding matrix of photo-detectors and matrix of light-emission elements. According to yet other alternatives, the vision system comprises a single illumination device, in order to illuminate just one of the two eyes.

Figure 7:
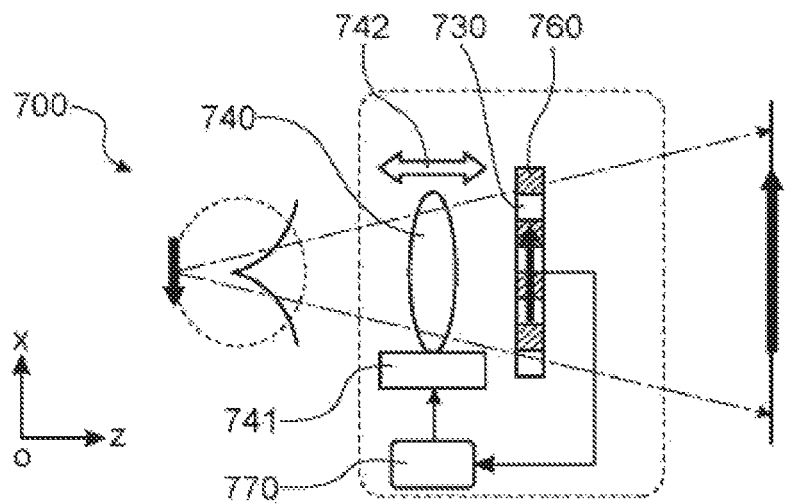
FIG. 7 illustrates schematically and in a cross-sectional view, a first embodiment of a vision system according to the invention.

FIG. 7 schematically illustrates, in a cross-sectional view in a plane (xOz), a first embodiment of a vision system 700 according to the invention.

The vision system 700 only differs from that of FIG. 2 in that each optical projection system 740 is a variable-focal-length optical system, connected to a respective device 741 for the control of its focal length.

The optical projection system 740 can consist of one or more lenses, at least one of which is capable of being translated along an axis parallel to (Oz). The translation is obtained using a mechanical stimulation provided by the corresponding device 741. Alternatively, the optical projection system 740 can consist of one or more lenses, at least one of which can be mechanically deformed using an electric stimulation provided by the corresponding device 741 (variable-focal-length lens).

The device 741 for controlling focal length is configured to receive as an input a command provided by the computer 770, preferably in digital form, and to convert this command into a stimulation on the optical projection system 740, in such a way as to modify its focal length in a controlled manner.

The computer 770 is configured to receive as an input an image formed on the matrix of photo-detectors 760, in particular an at least partial image of the retina. If this image is blurry, this means that the matrix of photo-detectors 760 is not perfectly optically conjugated with the retina of the eye. Since the matrix of photo-detectors 760 is arranged substantially coplanar with the matrix of light-emission elements 730, this also means that the matrix of light-emission elements 730 is not perfectly optically conjugated with the retina of the eye. In other words, in this configuration, the user sees a blurry image.

The computer 770 is configured to calculate an indicator of sharpness of this at least partial image of the retina. The indicator of sharpness designates an indicator characteristic of the sharpness of the image, that is to say of the measurement according to which the contours of the patterns forming the image are clear or on the contrary blurry. Said patterns are preferably formed by the blood vessels visible on an image of the retina. The indicator of sharpness is preferably a digital indicator. The calculation of the indicator of sharpness is preferably based on an analysis of contours. A person skilled in the art can find in the literature numerous methods for calculating such an indicator. For example, the indicator of sharpness is a parameter relative to the spreading of the edges of the pattern, in particular a maximum pixel gradient (maximum difference between the values of two neighbouring pixels). The computer 770 is further configured to formulate, on the basis of the indicator of sharpness, a command called command for adjusting focal length. The command for adjusting focal length is a command capable of modifying the focal length of the optical projection system 740 in such a way that the indicator of sharpness of the image received by the computer 770 varies in the direction of an increase in the sharpness. The computer 770 is connected at the output to the device 741 for controlling focal length, in order to transmit to it said command for adjusting focal length.

The computer thus carries out a control, in order to bring and then maintain the sharpness of the image received to/at a maximum value. In other words, it carries out an automatic adjustment of the vision system 700 to the vision of the user, in order to adapt said vision system 700 to the particularities specific to the eye of the user, or even to the conditions of use (positioning of contact lenses for example).

The vision system 700 can further comprise a memory, not shown, in order to store therein parameters associating a user identifier and an optimal adjustment of the respective focal lengths of the optical projection systems 740 associated with the two eyes of the user.

According to an alternative not shown, a control of the focal length of the optical projection system can be implemented manually, by a user who modifies the adjustment of the focal length until the user clearly sees an image displayed by the matrix of light-emission elements. The control can be implemented via an application on a smartphone, transmitting for example via Bluetooth a command for adjusting focal length to the device 741 for controlling focal length.

Figure 8A:
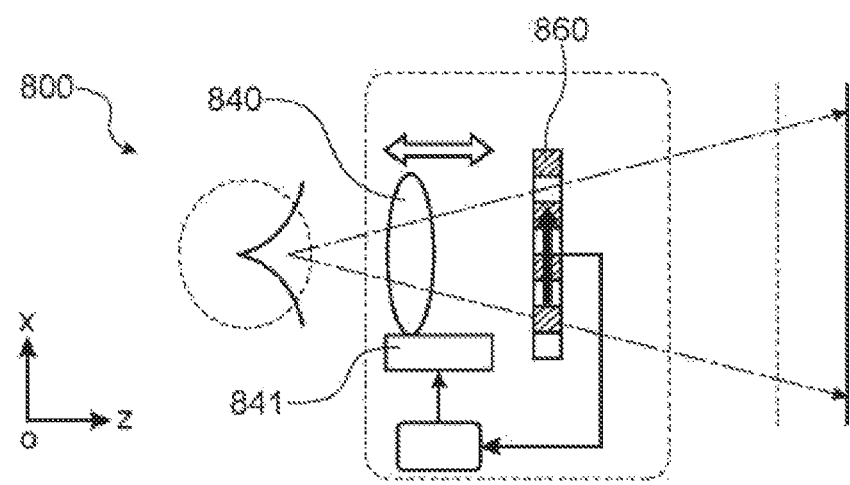
FIGS. 8A and 8B schematically illustrate, in a cross-sectional view and in two different positions, a second embodiment of a vision system according to the invention.
Figure 8B:
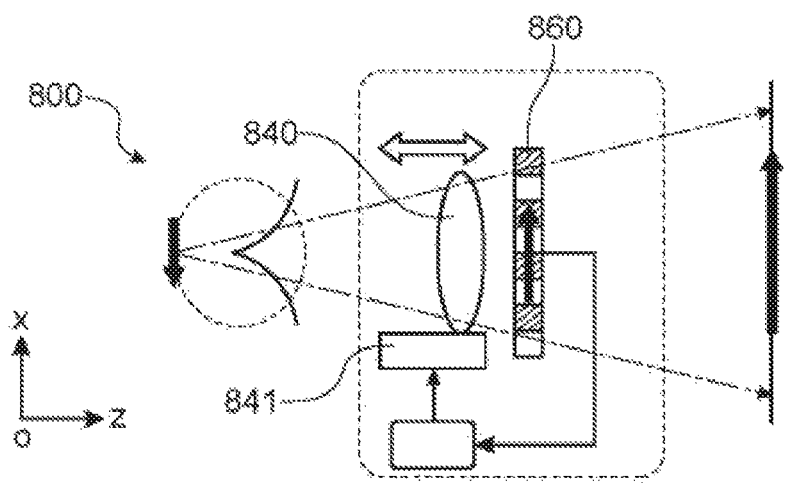

FIGS. 8A and 8B together illustrate a second embodiment of a vision system 800 according to the invention, shown in the two figures in a cross-sectional view in a plane (xOz).

In this embodiment as well, each optical projection system 840 is a variable-focal-length optical system, connected to a respective device 841 for the control of the focal length. Each respective optical projection system 840 is capable of occupying at least two positions, among which:
- a position for image acquisition of the iris, illustrated in FIG. 8A, in which the matrix of photo-detectors 860 and a surface passing through the iris of the eye are optically conjugated in pairs, via an optical system comprising the optical projection system 840, elements of the eye between the iris and the cornea, and if necessary a contact lens; and
- a position for image acquisition of the retina, illustrated in FIG. 8B, in which the matrix of photo-detectors 860 and a surface passing through the retina of the eye are optically conjugated in pairs, via an optical system comprising the optical projection system 840, elements of the eye between the retina and the cornea, and if necessary, a contact lens.

Each optical projection system 840 occupies one or the other of these two positions, according to a setting provided by the corresponding device 841.

The computer 870 is capable of implementing an analysis of the image received in order to deduce therefrom a parameter relative to the user, in particular when the optical projection system 840 is in a position for image acquisition of the iris.

The various embodiments presented above can be combined with each other.

Numerous other alternatives can be implemented without going beyond the context of the invention, for example the two matrices of light-emission elements formed together as one piece in a single screen.

According to an advantageous alternative, the vision system according to the invention comprises a smartphone, on the one hand, and a support capable of being mounted on the head of a user, on the other hand. The surface of the screen of the smartphone is divided into two zones, each forming one of the two matrices of light-emission elements of a vision system according to the invention. The screen is adapted in order to also incorporate a sensor, the surface of which is divided into two zones each forming a matrix of photo-detectors according to the invention. Likewise, a processor on board the smartphone forms the computer of a vision system according to the invention. The support is formed distinct from the smartphone, provided with a housing adapted for receiving the smartphone in such a way that during use the screen extends in front of the eyes of the user. The support is provided with two optical projections systems, arranged in order to be located in front of the screen, during use, and in order to form two optical projection systems of a vision system according to the invention. For standard dimensions of a smartphone screen, approximately 14*7 cm$^2$, a satisfactory image of the retina is obtained with an optical projection system having a magnification of approximately 3. This magnification is compatible with the resolution of the routine smartphone screens on the market as well as with the visual acuity of the human eye.

The invention can also cover said multi-function smartphone, intended to form an integral part of a vision system according to the invention.

In the examples, various embodiments of a system for vision in virtual reality according to the invention have been described. According to other embodiments, not shown, the vision system according to the invention forms a system for vision in augmented reality. A person skilled in the art can easily adapt the examples described above to the case of a system for vision in augmented reality, for example by preferring the use of a transparent substrate in order to create the light-emission elements and the photo-detectors (for example a TFT substrate and light-emission elements of the OLED type). In addition or alternatively, a person skilled in the art can integrate one or more partially reflective plates, in order to move the matrices of photo-detectors and of light-emission elements out of the field of vision of the eye and let the light coming from an outside scene pass through.

According to other alternatives not shown, the matrix of light-emission elements, and with it the matrix of photo-detectors, extend according to a curved surface. Such an arrangement can be implemented in order to minimise aberrations produced by the optical projection system.

Preferably, the vision system according to the invention comprises two assemblies each comprising a matrix of light-emission elements, a matrix of photo-detectors, and an optical projection system. Each of these assemblies is dedicated to an eye of the user. The invention is not, however, limited to this configuration, and can also cover devices comprising for example a single matrix of photo-detectors for example in order to carry out an identification on a single user eye.

FIGS. 9 to 13 illustrate various methods implemented using a vision system according to the invention. All these methods comprise a preliminary step, not shown, of positioning on the head of the user the support capable of being mounted on the head of a user. This is for example a step of placement of a mask in front of the eyes of the user.

Figure 9:
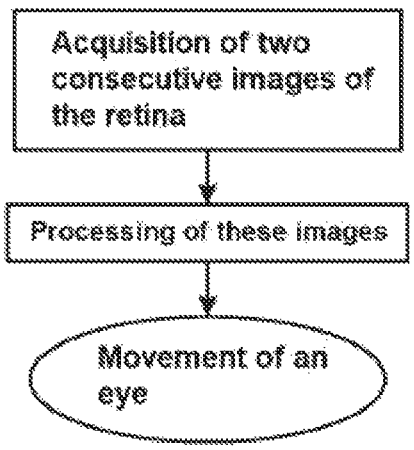
FIGS. 9 to 13 schematically illustrate various methods capable of being implemented using a vision system according to the invention.

The method of FIG. 9 is a method for monitoring the direction of the gaze. It comprises the following steps, preferably implemented for both eyes of the user:
- acquisition of two at least partial images of the retina, using the matrix of photo-detectors according to the invention;
- processing of said images, using the computer, in order to deduce therefrom a movement of the retina between the acquisition of one and of the other of said images.

Said movement advantageously corresponds to a rotation of the line of sight of the eye, where the line of sight is a line connecting a point at which the eye is looking and the centre of this eye. The movement is deduced from a comparison between the two successive images of the retina, in particular a cross-correlation between the latter. The known methods for comparing images in order to define a movement can be used.

Images of the retina are preferably acquired intermittently, during the entire duration of a video display by the matrix of light elements. Each image acquired is compared to the previous image, in order to deduce therefrom a corresponding movement of the retina between the two instants of acquisition. There is no need for a complete image of the retina in order to obtain a fluid detection of the movements of the eye. A block of pixels of the matrix of photo-detectors suffices, centred on the centre of the matrix of light-emission elements. The dimensions of the block of pixels are a function of a maximum speed of movement of the eye relative to the matrix of photo-detectors, and of a rate of acquisition of images of the retina. For example, the retina images are acquired at the same rate as the display of images on the matrix of light-emission elements. The retina images are acquired for example at a frequency of 10 images per second. In these conditions, and supposing that 1000 pixels of the matrix of photo-detectors corresponds to 110° on the field of vision, a block of 100*100 photo-detectors suffices to provide a fluid measurement of the movements of the eye. The number of pixels in the block can be reduced if the frequency of acquisition of images is increased.

The information relative to the movement of the retina is transmitted in real time to a processor which manages the video display on the matrices of light-emission elements. The video display can thus be adapted in real time to the movement of the eye.

In an alternative not shown, a position of the eye is determined, and more particularly an orientation of the line of sight, using a single image of the retina which is compared to calibration data. The calibration data can be obtained using a preliminary step of calibration, during which a series of points is displayed on the matrix of light-emission elements at predetermined locations, and the retina images obtained when the user successively looks at each of these points are analysed.

It can be considered that in both cases, a position of the eye is determined, either a relative position, or an absolute position.

Figure 10:
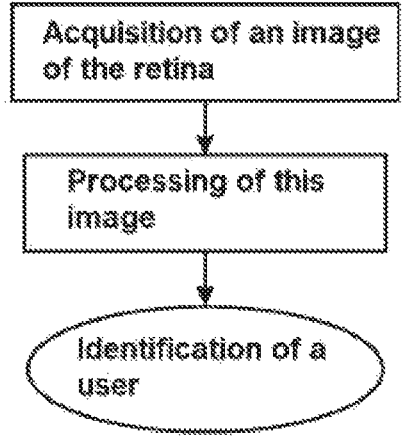

The method of FIG. 10 illustrates a method for identification of a user using an image of their retina. It comprises the following steps:
  acquisition of an at least partial image of the retina, using the matrix of photo-detectors according to the invention;
  processing of this image using the computer, in order to deduce therefrom an identifier of the user.

Advantageously, during an instant immediately preceding the image acquisition, the matrix of light-emission elements displays an image comprising a pattern in the centre, and the user looks at this pattern.

The computer is advantageously connected to a database, storing a plurality of pairs each associating a user identifier and an at least partial image of their retina. It then searches the database for the pair containing the retina image closest to the acquired image, and isolates the identifier associated with this pair. Alternatively, the retina images are compared indirectly, on the basis of characteristic parameters determined on the latter.

According to an advantageous alternative, a plurality of partial images of the retina can be acquired successively, and then these images can be combined in order to form a complete image of the retina. Complete retina images are thus compared. This alternative allows to reduce the number of pixels of the matrix of photo-detectors. The plurality of partial images are preferably obtained by requesting the user to follow a moving point with their gaze. If necessary the partial retina image can be acquired using a matrix of photo-detectors arranged coplanar with the matrix of light elements, but moved laterally relative to the latter.

It is noted that the method is advantageously implemented after adjustment of the focal length of the optical projection system, in such a way as to acquire a retina image as sharp as possible. The adjustment of focal length can be implemented by a method as described below, in reference to FIG. 12. Alternatively, it can be controlled manually, the user searching for an adjustment for which they see a sharp image. According to another alternative, the user indicates an identifier associated with an optimal adjustment of the optical projection system and then the method is implemented in order to confirm or not confirm the identity of the user.

It is also possible to implement the method according to the invention without any particular adjustment of the focal length of the optical projection system, the method being able to be implemented using slightly blurry images of the retina.

The user identifier can then be provided to a processor which manages the video display on the matrices of light-emission elements, for example in order to validate or not validate access to certain displays or services. It can also be used to obtain adjustment data associated with the user, for example data on adjustment of the focal length of the optical projection systems. More particularly, the focal length of the optical projection system associated with the eye other than that used for the identification of the user can be adjusted. The adjustment of the focal lengths using pre-recorded data does not prevent a later, finer adjustment using the steps illustrated in FIG. 12 (for example in order to adjust the focal lengths to particular conditions of use such as a positioning of a contact lens).

Figure 11:
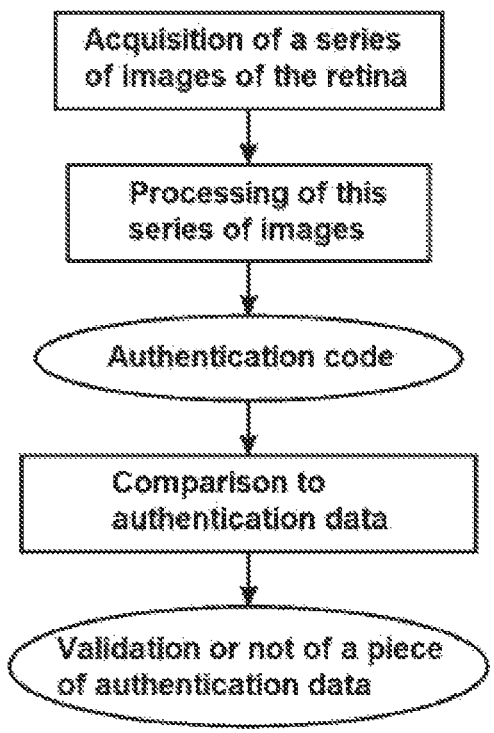

FIG. 11 illustrates a method for user authentication, in addition to or instead of an identification by an image of the eye. This method comprises the following steps:
  acquisition of a plurality of at least partial images of the retina using the matrix of photo-detectors according to the invention, while the user looks at various patterns in turn, according to a unique sequence which defines an authentication code, on at least one image displayed on the light matrix of elements;
  using the computer, processing of the plurality of image acquired in order to determine a series of positions or of movements of the eye, and in order to deduce therefrom said authentication code;
  comparison of the authentication code thus determined to an authentication code associated with an identifier previously received or determined, in such a way as to validate or invalidate the identifier.

The at least one image displayed on the light matrix of elements comprises a plurality of distinct patterns distributed in various regions of the image. This is for example an image with a star in the top left, a disc in the top right, a platypus on the bottom left, an arrow on the bottom right.

The authentication code is a code formulated by the eye, corresponding to a specific sequence of patterns. For example, the authentication code is the sequence "platypus-star-disc".

Figure 12:
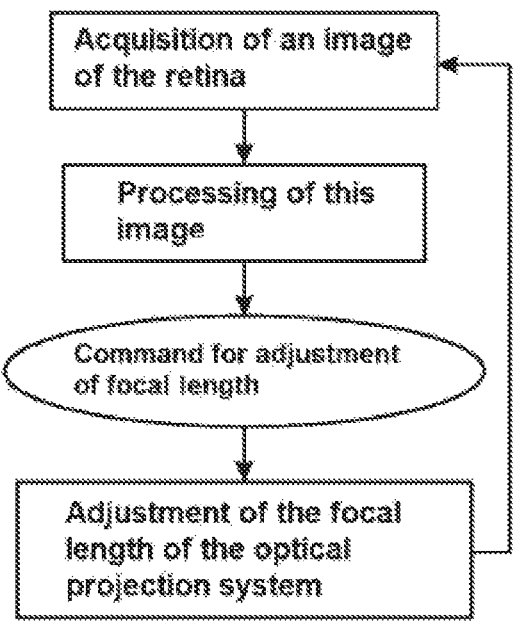

FIG. 12 illustrates a method for automatic adjustment of the optical projection device, implemented in a vision system like that illustrated in FIG. 7. This method comprises the following steps:

acquisition of an at least partial image of the retina, using the matrix of photo-detectors;

using the computer, processing of this image in order to determine an indicator of sharpness of this image, formulation of a command for adjustment of focal length and transmission of this command to the device for adjustment of focal length;

adjustment of the focal length of the optical projection device, using the device for adjustment of focal length and according to said command.

Advantageously, during the image acquisition, the matrix of light-emission elements displays an image comprising at the centre a pattern, and the user looks at this pattern.

The indicator of sharpness is for example calculated on the contours of the blood vessels of the eye visible in the image. It takes for example the form of a coefficient characteristic of a pixel gradient at the contours of the blood vessels in the image.

The command for adjustment of focal length is determined in such a way as to increase the sharpness of the image after adjustment of the focal length of the optical projection system according to said command.

These steps are implemented one or more times, until a maximum sharpness value is obtained.

The command for adjustment of focal length can correspond to a positive or negative increment. In a preliminary step, the sharpness of three images respectively associated with an initial value of the focal length, with this value reduced by an increment, and with this value increased by an increment is determined. The image for which the sharpness is the greatest is determined, it is deduced therefrom that the initial adjustment of the focal length is optimal, or that the focal length must be increased, or that the focal length must be reduced. Then, the focal length is increased, respectively decreased, by successive increments, and at each step the indicator of sharpness is calculated. As long as the sharpness increases, the adjustment of focal length is continued. When it starts to decrease, the previous value of the focal length is returned to.

Preferably, the focal length of both optical projection systems of a vision system according to the invention is thus adjusted.

If necessary, the optimal values of focal lengths can be stored in a memory, in association with a user identifier.

Optimal values of distance between the two eyes, associated with a user identifier, can also be determined and stored. The value of distance between the two eyes allows to define an optimal framing of the images displayed by the two matrixes of light-emission elements. A good quality of the vision in relief is thus guaranteed. The adjustment of the distance between the two eyes can involve the participation of the user by indicating to the computer at which moment they best perceive the relief. This distance can also be determined by identifying the fovea or a point of convergence of the blood vessels in a retina image. If necessary, this distance can also be determined on the basis of an image of the iris (see below).

Figure 13:
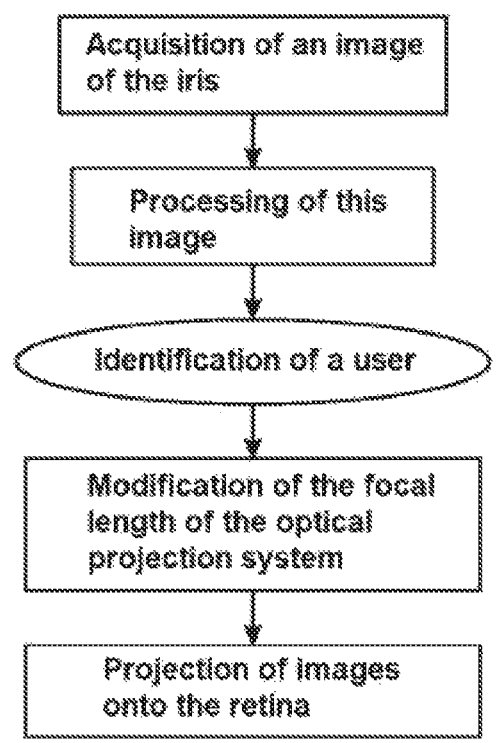

FIG. 13 illustrates a method for identification of a user, using an at least partial image of their iris. Such a method is implemented in a vision system of the type of that illustrated in FIGS. 8A and 8B. The method comprises the following steps:

adjustment of the focal length of the optical projection system, in order to place it in the position for image acquisition of the iris (see FIG. 8A), and acquisition of an at least partial image of the iris using the matrix of photo-detectors;

using the computer, processing of the image of the iris in order to deduce therefrom an identifier of the user; and new adjustment of the focal length of the optical projection system, in order to place it in the position called position for image acquisition of the retina (see FIG. 8B), this position also corresponding to a position for viewing a video display displayed by the matrix of light-emission elements; and display of images by the matrix of light-emission elements, the images being projected onto the retina and together forming a video sequence.

The computer is advantageously connected to a database, which stores a plurality of pairs each associating a user identifier and an at least partial image of their iris (or the value of one or more parameters characteristic of an image of their iris). If necessary, the computer determines the value taken by this or these characteristic parameters, on the acquired image. It then searches the database for the pair containing the iris image closest to the acquired image, respectively the value(s) of parameter(s) closest to the at least one value thus determined, and isolates the identifier associated with this pair. The identifier can then be provided to a processor which manages the video display on the matrices of light-emission elements, for example in order to validate or not validate access to certain displays or services.

Alternatively, the matrix of photo-detectors can be optically conjugated in turn with the iris and with the retina, via a complementary lens which can be inserted and removed on the optical path of the light between the eye and the matrix of photo-detectors.

The various methods can be combined with each other. For example, the identification by the iris and the identification by the retina can be implemented can be implemented in turn, which reduces even more the risks of falsification.

If necessary, an identifier can also be implemented by using: the distribution of the blood vessels around the iris, or an image of the cornea, or an image of a region of the face around the eye, or characteristics of the movement of the eye.

In each of these methods according to the invention, a video display is not interrupted for the acquisition of an image of the eye, in particular an at least partial image of the retina. Throughout the text, an at least partial image of the retina can include the projection onto the retina of an image projected by the optical projection system.

Advantageously, and in order to eliminate the effect of the images formed on the retina, an image of the eye is acquired during a very short time interval between the display of two subsequent images of a video sequence. During the image acquisition, the pixels of the matrix of light-emission elements can all be turned off. Advantageously they are all turned on and together form a uniform image allowing to sufficiently illuminate the eye. For example, the images of the video display succeed one another at a frequency of 100 Hz, with in each period 5 ms of display of an image of the video sequence and 5 ms of the matrix of light-emission elements turned off (or display of a uniform image).

The display of a uniform image allows to sufficiently illuminate a region of the eye to be imaged, but can cause visual discomfort for the user. One solution is to illuminate the eye using a light beam not visible to the user, and to turn off the matrix of light-emission elements during the image acquisition. FIG. 5 illustrates an example of a vision system facilitating the comprehension of the invention and capable of implementing such an illumination.

When the eye remains stationary during the adapted duration, a slow acquisition of an image of the eye can be carried out, and more particularly a slow reading of the signals on the photo-detectors of the matrix of photo-detectors. The acquisition of an image of the eye thus comprises a plurality of elementary steps of reading a signal, and in each of these elementary steps, a signal is read on only a portion of the photo-detectors of the matrix of photo-detectors (for example only several lines, in any case at least several pixels according to the two axes of the matrix in order to be able to implement an image reconstruction). Between two elementary steps of reading the signal, one or more images of a video sequence are displayed, on the matrix of light-emission elements. Various sequences can be implemented, for example successive cycles each comprising a display of image(s) of a video sequence, a signal acquisition by one or more lines of photo-detectors and a reading of said line(s). The duration of each elementary step is for example less than or equal to 10 ms. The total duration of acquisition of an image of the eye is for example greater than or equal to 100 ms. Alternatively, the frequency of the video display is 25 images per seconds, or a period of 40 ms. For example 10 ms are thus devoted to the image acquisition and 30 ms to the image display.

By increasing a duration of acquisition, an intensity of the illumination of the region of the eye to be imaged can be reduced. This allows for example to reduce an energy consumption of the illumination device outside of the visible spectrum as described in relation to FIG. 5. This also makes possible the use of photo-detectors with small dimensions, less sensitive than photo-detectors with a large breadth.

This slow acquisition is particularly adapted to methods for identification of the user.

Sequences other than that described above can be implemented. For example, a signal on all the photo-detectors can be acquired all at once then a plurality of cycles of signal reading and display of image(s) of a video sequence can be implemented.

The invention has numerous uses other than those described above. For example, a detection of life can be carried out, in order to verify that the user identification is carried out on a live eye and not on a fake imitation. For this, the user is asked to look at a series of predetermined regions on one or more images displayed by the matrix of light-emission elements, and the consistency with a movement of the eye determined on the basis of images of the retina is verified. For example, the user is asked to follow an object on a video sequence projected by the matrix of light-emission elements.

A detection of life can also be carried out on the basis of images of the iris obtained using a vision system according to the invention, by verifying that micro-contractions of the pupil or macro-contractions are indeed observed in response to stimulation by infrared radiation.

As described above, it is possible to acquire a complete image of the retina on the basis of a plurality of partial images obtained for various directions of gaze of the eye. The plurality of partial images are obtained by asking the user to follow an object with their gaze, on a video sequence displayed by the matrix of light-emission elements. A complete image of the retina can also be applied in the field of ophthalmology.

The invention claimed is:

1. A system for vision in virtual reality or in augmented reality, in a support configured to be mounted on a head of a user, the system comprising:
    at least one matrix of light-emission elements, which extends according to a display surface dedicated to display of images configured to be seen by the user;
    at least one optical projection system configured to form an image of the at least one matrix of light-emission elements on a focusing surface at a distance from an eye of the user;
    at least one matrix of photo-detectors configured to acquire at least one image of a region of the eye, which extends according to a capture surface and which is arranged substantially coplanar with the at least one matrix of light-emission elements, with an at least partial overlap between the capture surface and the display surface; and
    a computer configured to receive as an input the at least one image acquired by the at least one matrix of photo-detectors, and to implement a processing of the at least one image so as to deduce therefrom one or more parameters relative to the user,
    wherein the at least one optical projection system is a variable-focal-length optical system, connected to a control device configured to control a focal length of the at least one optical projection system,
    wherein the at least one optical projection system is further configured to occupy a position for image acquisition of a retina, in which the at least one optical projection system participates, during operation, in an optical conjugation between the at least one matrix of photo-detectors and the retina of the eye, and
    wherein the computer is further configured to receive as an input at least one image of the retina, acquired by the at least one matrix of photo-detectors and to provide the control device with a command for adjustment of focal length, the command being determined so as to increase a sharpness of the image of the retina.

2. The system according to claim 1, wherein the at least one matrix of photo-detectors and the at least one matrix of light-emission elements are each arranged in or on a same substrate.

3. The system according to claim 1, further comprising at least one illumination device configured to emit, during operation, an illumination light beam in a direction of the eye, the at least one illumination device being configured to emit at wavelengths located outside of the visible spectrum, and the photo-detectors of the at least one matrix of photo-detectors being sensitive to these wavelengths.

4. The system according to claim 1, wherein:
    the at least one optical projection system is further configured to occupy a position for image acquisition of a retina, in which the at least one optical projection system participates, during operation, in an optical conjugation between the at least one matrix of photo-detectors and the retina of the eye, and
    the computer is further configured to receive as an input at least one image of the retina acquired by the at least one matrix of photo-detectors and to process the at least one image so as to determine a piece of information on identification of the user, a piece of information relative to a movement of the eye, or a piece of information relative to a position of the eye.

5. The system according to claim 1, wherein:
    the at least one optical projection system is further configured to occupy at least two positions out of a position for image acquisition of the retina, in which the at least one optical projection system participates, during operation, in an optical conjugation between the at least one matrix of photo-detectors and the retina of the eye, and a position for image acquisition of the iris, in which the at least one optical projection system participates, during operation, in an optical conjugation between the at least one matrix of photo-detectors and the iris of the eye, the control device is further configured to adjust the focal length of the at least one optical projection system so as to make said system occupy one and then the other out of the position for image acquisition of the iris and the position for image acquisition of the retina, and the computer is further configured to receive as an input at least one iris image acquired by the at least one matrix of photo-detectors and to process the at least one iris image so as to determine a piece of information on identification of the user.

6. The system according to claim 1, further comprising a multi-function smartphone, wherein:

the multi-function smartphone comprises a display screen forming the at least one matrix of light-emission elements, the computer, and the at least one matrix of photo-detectors, and the support configured to be mounted on the head of the user is provided with a housing configured to receive the multi-function smartphone and comprising the at least one optical projection system.

7. A method for acquisition of parameters of an eye, implemented by a system according to claim 1, the method comprising:

positioning the support on the head of a user;

acquiring at least one image of a region of an eye of the user, using a matrix of photo-detectors, the acquiring comprising acquisition of an at least partial image of the retina;

processing the at least one image acquired, using the computer, in order to deduce therefrom one or more parameters relative to the eye of the user, said processing comprising calculation of an indicator representative of a sharpness of the acquired image, formulation of a command for adjustment of focal length, and transmission of the command to the control device; and using the control device, adjusting the focal length of the at least one optical projection system according to the command for adjustment of focal length, wherein these steps are implemented one or more times, and until a maximum sharpness of the image of the retina is obtained.

8. The method according to claim 7, further comprising a step of recording data on adjustment of the at least one optical projection system, in association with a piece of information on identification of the user, the data on adjustment being associated with a value of focal length of the at least one optical projection system for which a sharpness of the image of the retina is maximal.

9. The method according to claim 7, further comprising a plurality of steps of acquisition of the at least partial image of the retina, separated in pairs by a respective step of display of at least one image by the at least one matrix of light-emission elements.

10. The method according to claim 7, wherein:

the acquisition of the at least partial image of the retina comprises a plurality of elementary steps of signal reading, each for reading a signal on only a portion of the photo-detectors of the at least one matrix of photo-detectors, and the elementary steps of signal reading are implemented successively, separated in pairs by a respective step of display of at least one image by the at least one matrix of light-emission elements.

11. The method according to claim 7, further comprising:

acquiring an at least partial image of the retina, using the at least one matrix of photo-detectors; and processing the acquired at least partial image using the computer, so as to deduce therefrom a piece of information on identification of the user.

12. The method according to claim 7, further comprising:

acquiring one or more at least partial images of the retina, using the at least one matrix of photo-detectors; and processing the acquired one or more at least partial images using the computer, so as to deduce therefrom a piece of information relative to a movement or to a position of the eye.

13. The method according to claim 7, further comprising:

displaying at least one predetermined image by the at least one matrix of light-emission elements, the at least one predetermined image comprising a plurality of patterns distributed in a space, and acquiring a series of at least partial images of the retina using the at least one matrix of photo-detectors;

processing the at least partial images of the retina, using the computer, so as to deduce therefrom a piece of information relative to a series of positions of the eye, or a series of elementary movements of the eye, and determining an authentication code formulated by movement of the eye during the acquiring of the series of at least partial images; and comparing to authentication data so as to validate or invalidate a piece of information on identification of the user.

14. The method according to claim 7, further comprising:

adjusting a focal length of the at least one optical projection system, in order to place the system in a position for image acquisition of an iris in which the system participates in an optical conjugation between the at least one matrix of photo-detectors and the iris;

acquiring an at least partial image of the iris, and processing of the acquired at least one partial image using the computer so as to deduce therefrom a piece of information on identification of the user;

performing a new adjustment of the focal length of the at least one optical projection system, in order to place the system in a position for image acquisition of a retina in which the system participates in an optical conjugation between the at least one matrix of photo-detectors and the retina; and displaying the acquired at least partial images by the at least one matrix of light-emission elements.

* * * * *